(12) United States Patent
Hansen

(10) Patent No.: US 7,103,795 B1
(45) Date of Patent: Sep. 5, 2006

(54) TESTING PLATFORM INTEGRATION METHODOLOGY

(75) Inventor: Kevin Hansen, Shawnee, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 470 days.

(21) Appl. No.: 10/160,680

(22) Filed: May 31, 2002

(51) Int. Cl.
*G06F 11/00* (2006.01)
*H04M 3/22* (2006.01)

(52) U.S. Cl. .......................... 714/4; 714/57; 379/9.03; 379/10.01

(58) Field of Classification Search ............... 379/9.03, 379/9.04, 10.01, 9.02, 27.04, 29.09, 29.1; 714/57, 56, 4
See application file for complete search history.

(56) References Cited

U.S. PATENT DOCUMENTS

| | | | | |
|---|---|---|---|---|
| 5,528,748 A * | 6/1996 | Wallace | ........................ | 714/25 |
| 5,666,481 A * | 9/1997 | Lewis | ............................ | 714/4 |
| 5,852,649 A * | 12/1998 | Hodson | ........................ | 379/9 |
| 5,987,633 A * | 11/1999 | Newman et al. | ............ | 714/712 |
| 6,385,298 B1 * | 5/2002 | Beyda et al. | .................. | 379/9 |
| 6,445,774 B1 * | 9/2002 | Kidder et al. | .............. | 379/9.03 |
| 6,449,341 B1 * | 9/2002 | Adams et al. | ................. | 379/9 |
| 6,587,543 B1 * | 7/2003 | Howard et al. | ......... | 379/10.01 |
| 6,658,586 B1 * | 12/2003 | Levi | .............................. | 714/4 |
| 6,788,765 B1 * | 9/2004 | Beamon | .................. | 379/27.01 |
| 6,813,634 B1 * | 11/2004 | Ahmed | ....................... | 709/224 |
| 6,870,900 B1 * | 3/2005 | Beamon | .................... | 379/9.03 |
| 2003/0083838 A1 * | 5/2003 | Barrell et al. | ............... | 702/117 |

* cited by examiner

*Primary Examiner*—Robert Beausoliel
*Assistant Examiner*—Christopher McCarthy

(57) ABSTRACT

A method for automatically testing elements in a telecommunications network. An automated testing protocol is initiated based on the notification of a network event. When test results are received from the automated testing protocol, a trouble ticket is automatically opened containing the test results. The trouble ticket is then routed to the appropriate party. In embodiments of the invention, test results are logged, a database is queried to determine if the event has occurred previously, the trouble ticket is prioritized based on the severity of the event, and a time stamp is placed on the trouble ticket. The automated testing protocol and the event correlation database can be accessed through a graphical user interface. Multiple automated testing modules can be integrated into a single graphical user interface. Users can log in to prevent interference among users.

15 Claims, 2 Drawing Sheets

TESTING PLATFORM INTEGRATION METHODOLOGY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the management of errors in a telecommunications network. More particularly, embodiments of the present invention provide an integrated system for automatically detecting, verifying, isolating, reporting, and logging errors and other events in a telecommunications network.

BACKGROUND OF THE INVENTION

Telecommunications networks typically include components such as ATM switches, frame relay switches, voice switches, routers, servers, and other equipment for processing and transmitting data. These components can be referred to collectively as network elements. Errors, alarms, and other undesirable conditions can occur in network elements. Examples include line bouncing, slow response, and customer reported conditions. Conditions such as these can be referred to as events. In a typical embodiment of a telecommunications network, each network element has a network manager and/or interface to provide fault and performance information on the circuits traversing the network. Notification that an alarm or other event has occurred is typically transmitted to a fault management module where information about an event, such as the type of event and the equipment on which the event occurred, can be read by a technician. The technician then manually searches an event correlation database to determine if the event is ongoing or if it is a new occurrence. For new events, the technician searches a database of network elements to correlate network element identification data received from the fault management module with the name and location of the faulty network element. The technician then performs a series of manual tests on the network element that generated the event notification. If the tests indicate that a fault exists, the technician opens a trouble ticket describing the problem and sends the ticket to the appropriate agency for repair of the problem. The technician manually logs all actions taken in response to the event notification in the trouble ticket.

Many alarms and other events are anomalous, one-time events that do not necessarily indicate an error. Technicians must investigate every event and complete the process described above to verify that an actual error exists. This process is time-consuming, labor-intensive, and expensive.

Two types of testing are typically done on a telecommunications network: physical layer testing and logical layer testing. Testing the physical layer of a network involves investigating the performance of the lowest protocol layers of transport (layer one of the OSI Model), such as Sonet, DS-1, DS-3, etc. Logical layer testing involves verifying the integrity of the performance of the higher protocol layers (layer two and up of the OSI Model), such as ATM, Frame Relay, IP, voice, etc.

Tests that interrupt customer traffic are considered intrusive. They include inserting a test set into a circuit in a manner that causes customer traffic to be interrupted and insertion of test patterns or test traffic to evaluate circuit performance. Tests that do not interrupt customer traffic are considered non-intrusive. They include monitoring circuit performance, monitoring alarm and fault status, verifying mapping and configuration data, and verifying the state of network equipment.

SUMMARY OF THE INVENTION

An embodiment of the present invention provides a method for automatically testing elements in a telecommunications network. Notification of a network event is received and an automated testing protocol is initiated based on the event notification. When test results are received from the automated testing protocol, a trouble ticket is automatically opened containing the test results. The trouble ticket is then routed to the appropriate party. In embodiments of the invention, test results are logged, a database is queried to determine if the event has occurred previously, the trouble ticket is prioritized based on the severity of the event, and a time stamp is placed on the trouble ticket. The automated testing protocol and the event correlation database can be accessed through a graphical user interface. The graphical user interface has the capability of allowing multiple simultaneous automated tests to be performed. Users log into the system independently of each other to prevent interference while they run concurrent tests. The logging feature also provides network access security.

An embodiment of the invention is a system for automatically processing events occurring in elements of a telecommunications network. In this embodiment, the system comprises a fault management module to receive event notification from an element; an event correlation database to be queried by the fault management module to determine if an event is a new event, an existing event, or a repetitive event; a log within the event correlation database to record event information; an automated testing module to be activated when the event is new to query a database of network elements, retrieve information on an element based on identifying data sent to the automated testing module by the fault management module, and perform an automated series of tests on the element; a trouble ticketing system in which test result data is entered, prioritized, time stamped, and routed; and a graphical user interface to interface with the automated testing module and the event correlation database.

DETAILED DESCRIPTION OF THE PREFERRED EMBODIMENTS

The Testing Platform Integration system (hereafter referred to as the TPI system) provides an integrated environment for automatically testing the performance of multiple elements within a telecommunications network and for managing access to the testing system. Many of the testing, research, data logging, and reporting functions typically performed manually by technicians can be done automatically by the TPI system by incorporating the same circuit evaluation rules currently used by technicians in testing the physical layer. The TPI system can also perform "testing on demand" intrusive and non-intrusive circuit testing as needed upon instructions from a user via a graphical user interface. The TPI system also accepts requests for testing from tickets generated by a trouble reporting system or from other applications.

Figure 1:
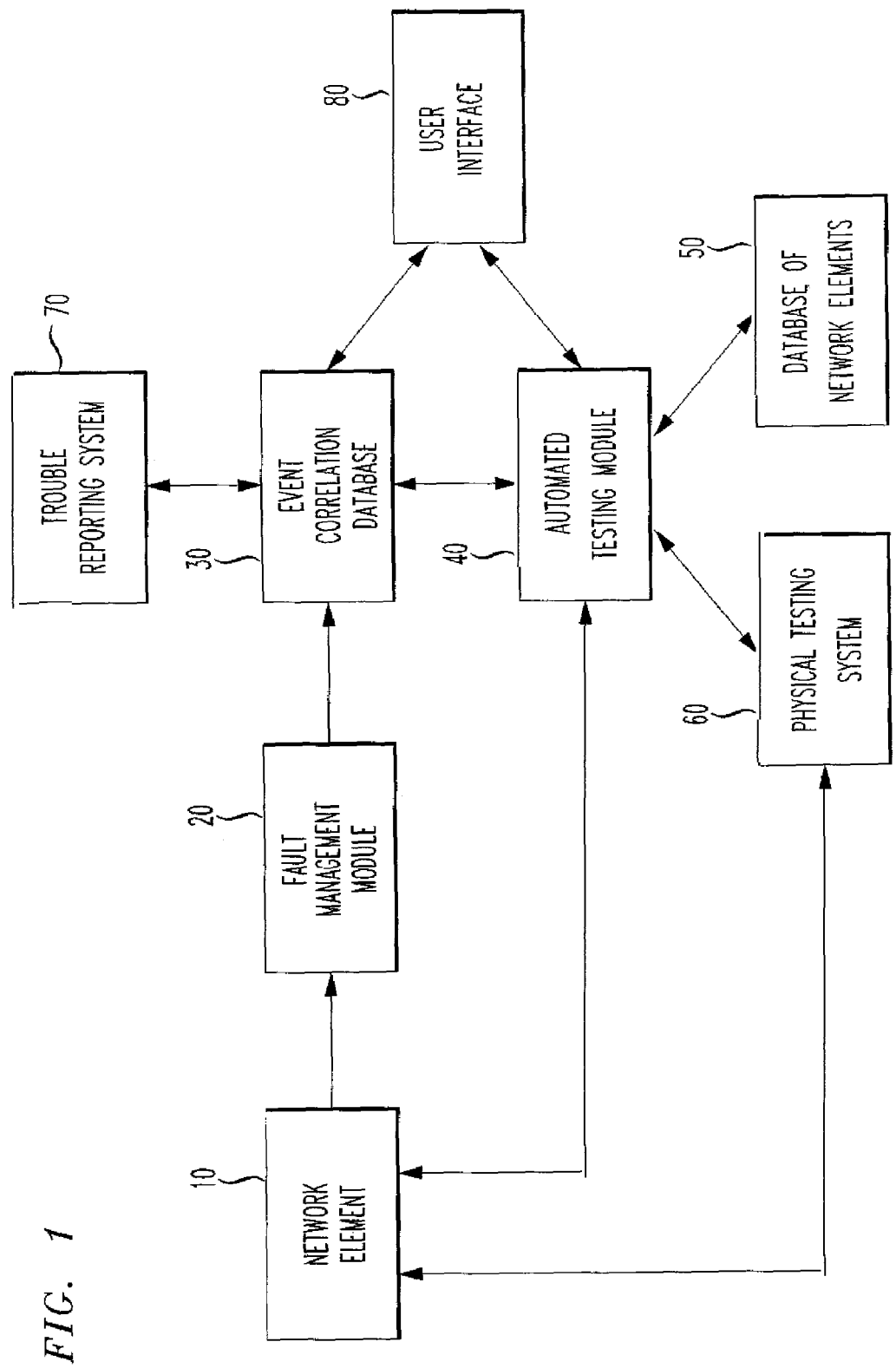
FIG. 1 is a block diagram showing components of an embodiment of the Testing Platform Integration system.

Components of one embodiment of the TPI system are shown in FIG. 1. Network element 10 is an element of a telecommunications network such as a switch or other equipment as previously indicated. Only one network element is shown in FIG. 1 but any number could be present. When an event occurs in network element 10, network element 10 sends notification of the event to a fault management module 20. The fault management module 20 receives data identifying the network element 10 on which the event occurred and the type of event (such as line bouncing or slow response). The fault management module 20 then queries the event correlation database 30 to determine whether the event is a new event or an event that has already been reported. For an existing event the additional notification of the event is logged in event correlation database 30 and no further action is taken. For a new event an automated testing module 40 is activated and follows an automated testing protocol. The automated testing module 40 queries a database of network elements 50 to determine the name and location of the faulty network element based on the identifying data received from the fault management module 20. Automated testing module 40 then sends the equipment information received from database 50 to a physical testing system 60. The physical testing system 60 verifies and isolates the fault using the same sequence of tests a technician manually investigating the event would use. For example, a technician might follow a flowchart showing a series of steps to be taken to isolate a problem. The physical testing system 60 might use software-implemented logic to follow the same series of steps to isolate a fault in a network element 10. Physical testing system 60 then sends its test results back to the automated testing module 40, which stores the results in event correlation database 30. Automated testing module 40 then uses the data stored in event correlation database 30 to open a trouble ticket in the trouble reporting system 70. The ticket can include text describing all data received regarding the event, all tests performed on the network element 10 generating the event, and all results of these tests. Automated testing module 40 prioritizes the ticket based on the severity of the problem, time stamps the ticket, and notifies the routing capabilities of the trouble reporting system 70 to route the ticket to the appropriate party.

All actions taken by the TPI system and all test data generated by the TPI system are logged in the event correlation database 30 for future reference. Users can access this database 30 via the user interface 80 to retrieve data and create customized reports on any past events.

In this embodiment, the user interface 80 provides users of the TPI system with a common graphical interface for all automated testing modules 40 used in the system. Although only one test module 40 is depicted in FIG. 1, in actual practice each type of network element 10 present in the network might use a different type of automated testing module 40. Each such module might be made by a different manufacturer and might display test results in different formats in different graphical interfaces. The outputs from these varied test modules are fed into the TPI system and displayed in a common format on user interface 80.

The user interface 80 also allows users to perform testing on demand. That is, in addition to the automated testing that is initiated by a network event, a user can order a particular test to be performed on a particular network element 10. The user can trigger the same sequence of tests that an alarm or other event would trigger. This can be used for installing new circuits in the network to verify their availability for service.

The TPI system automatically interacts with an existing trouble reporting system 70 by opening tickets for the reporting and tracking of events, entering test results into the tickets, and routing the tickets to the appropriate party. Trouble ticket information can also be extracted from the ticketing system 70 to initiate testing procedures. The TPI system allows tickets to be handled automatically or with less manual intervention.

Figure 2:
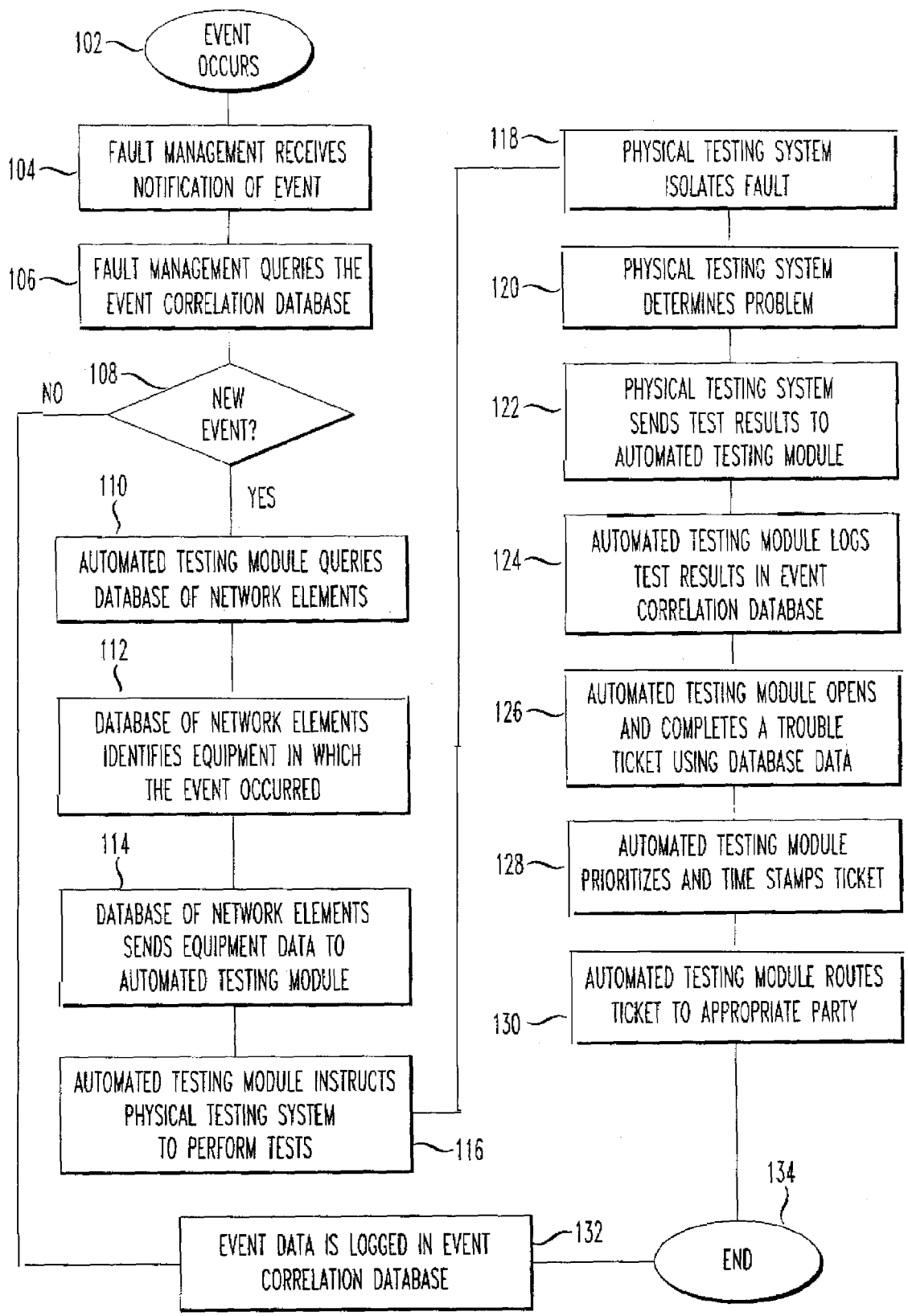
FIG. 2 is a flowchart showing steps taken by an embodiment of the Testing Platform Integration system.

A set of steps taken by an embodiment of the TPI system is shown in FIG. 2. In box 102, an event occurs in a network element. A fault management module receives notification of the event in box 104. In box 106, the fault management module queries an event correlation database. In box 108, the event correlation database determines if the event is a new event or if the same event has occurred previously. If the event is not a new event, the event is logged in the event correlation database in box 132 and the process ends in box 134. If the event is a new event, an automated testing module queries a database of network elements in box 110. In box 112, the database of network elements identifies the name and location of the equipment in which the event occurred. In box 114, the database of network elements sends equipment data back to the automated testing module. The automated testing module instructs a physical testing system to perform physical tests on the network element in box 116. In box 118, the physical testing system isolates the fault and in box 120, the physical testing system determines or attempts to further define the problem. The physical testing system sends the test results to the automated testing module in box 122. In box 124, the automated testing module logs the test results in the event correlation database. The automated testing module opens and completes a trouble ticket using data from the event correlation database in box 126. In box 128, the automated testing module prioritizes and time stamps the ticket. The automated testing module routes the ticket to the appropriate party in box 130 and the process ends in box 134.

When multiple technicians are simultaneously performing manual tests on a telecommunications network they can interfere with one another. The TPI system has a log-in feature that prevents such interference. Users wishing to perform manual tests or to access other features of the TPI system must log in to and be authorized by the system. The TPI system keeps track of who is logged in and the actions they are taking and it prevents users from performing any action that might interfere with the actions of another user.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for automatically testing elements in a telecommunications network comprising:
    receiving notification of a network event;
    verifying the existence of the event;
    determining whether the event has been previously reported; and
    responsive to the determination that the event has not been previously reported, performing steps comprising:
    initiating an automated testing protocol based on the event notification, wherein the automated testing protocol identifies the faulty element and generates test results regarding the faulty element;
    receiving test results from the automated testing protocol;
    automatically completing a trouble ticket containing the test results obtained from the automated testing protocol; and
    routing the trouble ticket to the appropriate party.

2. The method of claim 1 further comprising logging the results from the testing protocol.

3. The method of claim 2 further comprising querying an event correlation database to determine if the event has occurred previously.

4. The method of claim 3 further comprising prioritizing the trouble ticket based on the severity of the event.

5. The method of claim 4 further comprising placing a time stamp on the trouble ticket.

6. The method of claim 5 further comprising interfacing with the automated testing protocol and the event correlation database via a graphical user interface.

7. The method of claim 6 further comprising integrating multiple automated testing protocols into one graphical user interface.

8. The method of claim 7 further comprising logging in users to prevent interference among users.

9. The method of claim 1 further comprising: providing event identifying data to a network elements database so that the network elements database can identify the faulty element.

10. The method of claim 9 wherein the identification of the network element comprises the name and the physical location of the faulty element.

11. The method of claim 10 further comprising: characterizing the type of event.

12. The method of claim 11 wherein the automated testing protocol physically tests the faulty element.

13. The method of claim 12 wherein the automated testing protocol isolates the faulty element.

14. The method of claim 13 wherein the automated testing protocol analyzes the faulty element to determine the cause of the event within the faulty element.

15. The method of claim 14 wherein the trouble ticket includes the physical location to which a technician needs to be dispatched to repair or further test the faulty element.

* * * * *